Figure 5:
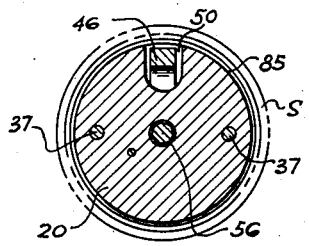
Figure 6:
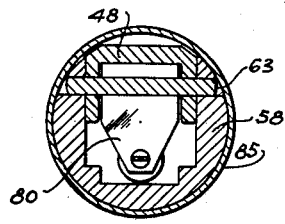

June 23, 1953   E. W. GRAHAM ET AL   2,642,671
INTERNAL GAUGE
Filed May 3, 1950　　2 Sheets-Sheet 1
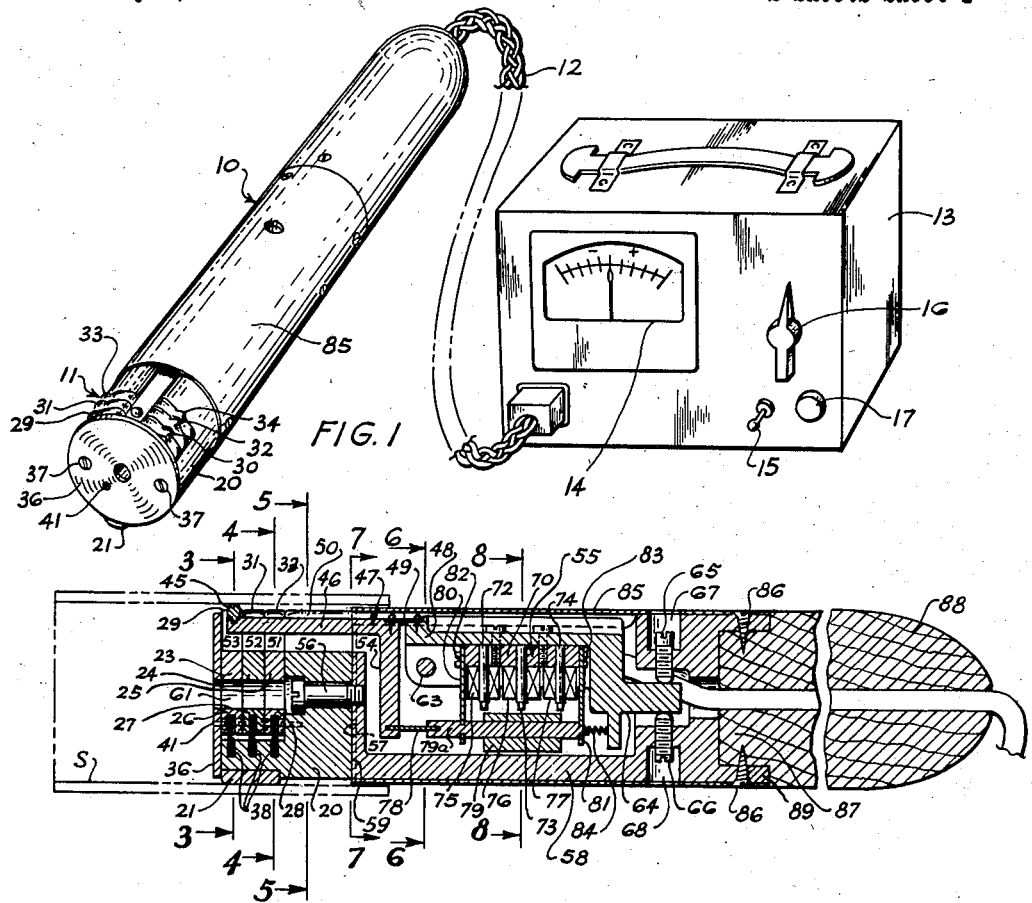
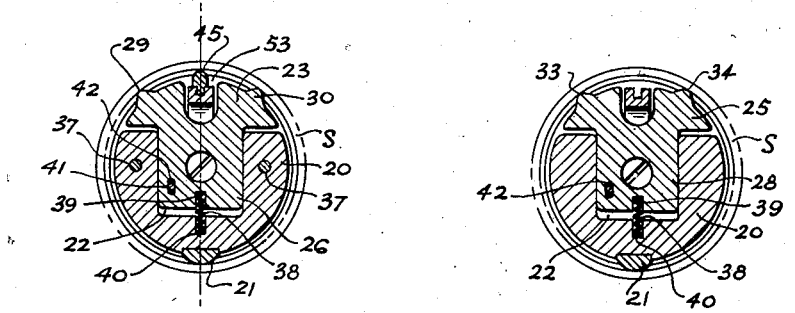
INVENTOR.
ERWIN W GRAHAM
WALTER O. MINTEL
BY Bosworth & Sessions June 23, 1953  E. W. GRAHAM ET AL  2,642,671
INTERNAL GAUGE Filed May 3, 1950  2 Sheets-Sheet 2

INVENTOR.
ERWIN W. GRAHAM
WALTER O. MINTEL
BY Bosworth & Sessions

Patented June 23, 1953

2,642,671

UNITED STATES PATENT OFFICE 2,642,671

INTERNAL GAUGE

Erwin W. Graham, Parma Heights, and Walter O. Mintel, Shaker Heights, Ohio, assignors to Cleveland Instrument Company, Cleveland, Ohio, a corporation of Ohio Application May 3, 1950, Serial No. 159,734

13 Claims. (Cl. 33—178)

This invention relates to internal micrometers or gauges and more particularly to internal micrometers or gauges of high sensitivity which are capable of making measurements to within a few millionths of an inch.

Heretofore the gauging of internal diameters has been difficult and has required a considerable amount of skill on the part of the person making the measurements. The reason for this is that the measurement must be made along a diameter of the opening being measured and perpendicular to the axis of the opening; deviation from a true diameter gives a reading that is too small, deviation from the perpendicular gives a reading that is too large. The difficulty is aggravated because of the fact that in order to obtain highly accurate measurements, at least one of the measuring elements should make point contact with the surface of the work to be measured and the other must make no more than line contact; if both of the measuring elements make line or surface contact with the work being measured, then surface irregularities and the presence of dust, dirt or surface films may seriously impair the accuracy of the measurements. Therefore, internal gauges which have been dependent upon line or surface contacts of both measuring elements in order to position the gauge within the opening being measured have not been suitable for measurements involving very high precision.

A general object of the present invention, therefore, is the provision of an internal micrometer, gauge or comparator capable of making measurements to an accuracy of within a few millionths of an inch. Another object of the provision of an internal micrometer or gauge by the use of which accurate measurements of internal diameters can be made without requiring any particular skill or experience on the part of the operator. A further object is the provision of a gauge which is substantially self-aligning so that the gauging element automatically takes a correct position within the opening to be measured. Other objects are the provision of an internal gauge which is capable of measuring diameters near the ends of openings; the provision of a gauge that can be adjusted easily and rapidly to a standard dimension by means of gauge blocks or the like; the provision of a gauge in which the zero position can be adjusted readily; the provision of a gauge in which the effects of temperature changes are minimized; the provision of a gauge embodying interchangeable gauge heads so that the gauge can be adapted for a wide range of measurements simply by changing the gauge heads while utilizing the same gauge body and indicating instrument.

Figure 7:
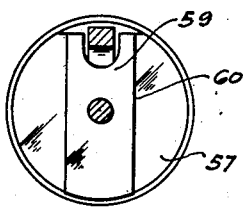
Figure 8:
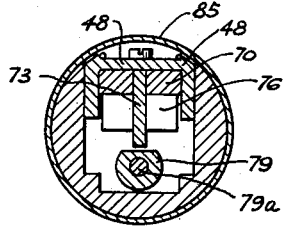
Figure 9:
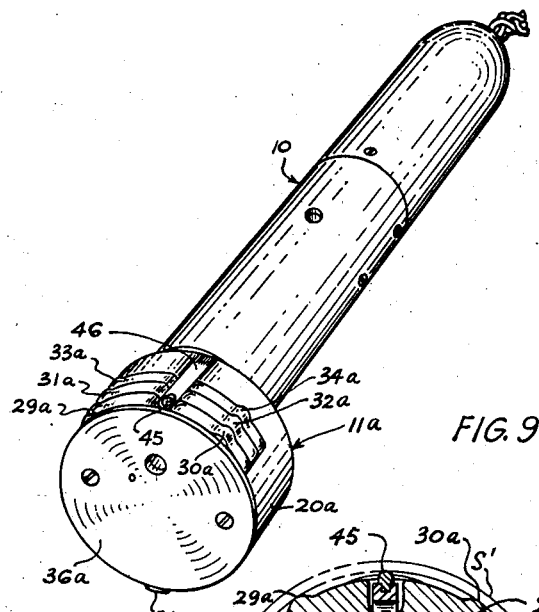
Figure 11:
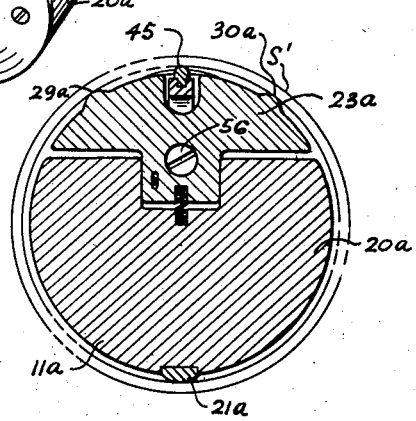
Figure 10:
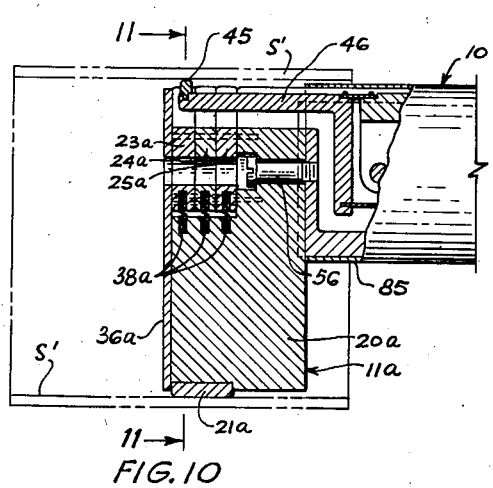

Further objects and advantages of the invention will become apparent from the following description of a preferred form thereof, reference being made to the accompanying drawings in which Figure 1 is a perspective view illustrating the complete gauge including a gauge head and body embodying the present invention and an electronic indicator associated with the gauge; Figure 2 is a longitudinal section through the center of the gauge shown in Figure 1 showing the gauge head in position with a sleeve to be measured; Figures 3, 4, 5 and 6 are transverse sections through the gauge of Figure 2 taken along the lines 3—3, 4—4, 5—5 and 6—6, respectively, of Figure 2; Figure 7 is an end view of the handle portion viewed in the direction of the arrows 7—7 of Figure 2; Figure 8 is a transverse section through the gauge of Figure 2 taken along the line 8—8 of Figure 2; Figure 9 is a perspective view similar to Figure 1 but showing a head of larger diameter attached to the gauge body of Figures 1 and 2; Figure 10 is a partial longitudinal section through the gauge of Figure 9; and Figure 11 is a transverse section taken along the line 11—11 of Figure 10.

Preferably, a gauge made according to a preferred form of our invention comprises a gauge head embodying an anvil or fixed contact member adapted to make a line contact with the internal surface of an opening to be measured and a movable contact member or gauging point adapted to make point contact with the surface diametrically opposite the fixed contact. To guide the gauge head into proper position with respect to the opening to be measured, a plurality of spring pressed locating pieces are provided, one of which is preferably immediately adjacent the gauging point. Each of the locating pieces engages the internal surface of the opening at zones on opposite sides of the gauging point and equally spaced therefrom. Each locating piece makes line contact in its particular zone, but the locating pieces are independently movable with respect to the fixed anvil; thus the spring pressure of the separate locating pieces functions to hold the fixed anvil in proper contact with the surface even though the surface may be tapered slightly as is usually the case. Therefore, the distance between the fixed anvil and the movable gauging point is measured along a line which is almost precisely at right angles to the line of contact of the anvil with the surface, and this line may be considered to be a diameter of a circle or cylinder defined by the fixed anvil and the contacting elements of the particular locating piece immediately adjacent the gauging point or a diameter of the right circular cylinder defined by the anvil and the contacting elements of the locating pieces. The locating pieces locate the gauge head in the opening to be measured so that the center of the circle or the axis of the cylinder, whichever it is considered to be, almost precisely corresponds with the center or axis of the opening. Hence, the measuring point is located, with only a very small error, on a diameter of the opening to be measured, which diameter passes through the line of contact of the fixed anvil with the surface of the opening.

The gauge head is removably secured to a handle member which preferably includes a pickup embodying an armature movable by the gauging point; the output of the pickup is amplified by suitable electronic circuits and indicated on a meter calibrated to read in terms of deflection on either side of a central zero. The pickup and the support for the gauging point are adjustably mounted in the handle so that the gauge readily can be set to zero position. Preferably the pickup and indicating circuits are constructed in accordance with the disclosure of the copending applications of Michael Bozoian Serial No. 771,528, filed August 30, 1947, now Patent No. 2,508,370, and Erwin W. Graham Serial No. 785,315, filed November 12, 1947, both of which are assigned to the assignee of this application.

Referring now to the drawings, Figure 1 shows a gauge made according to a preferred form of the invention and comprising a body or handle portion 10 and a gauge head indicated in general at 11. A conductor or cable 12 connects the gauge proper with the electronic circuits contained within the cabinet 13, the zero center meter 14 being mounted on the front face of the cabinet. A switch 15 is provided for turning the electronic circuits on and off. The selector switch 16 is employed to make available two different degrees of sensitivity of the instrument by changing the amount of amplification by well-known circuit means, forming no part of the present invention, and the knob 17 adjusts the circuit to make minor adjustments of the zero setting of the meter 14. As noted above, the electronic circuit is preferably substantially the same as that described in the aforesaid Bozoian application, and will not be described in detail herein. For purposes of the present invention, which relates primarily to the construction of the gauge itself, it is sufficient to state that the electronic apparatus amplifies the signal currents generated in the gauge head and applies them to the meter 14 so that the needle of the meter gives an accurate indication of the direction and magnitude of deviations of the position of the gauging point from a preset zero position.

As shown particularly in Figures 1 to 5 the gauge head 11 comprises a generally cylindrical body portion 20 in which the anvil or fixed contact member 21 is rigidly supported. Anvil 21 is preferably composed of tungsten carbide or other very hard material; the anvil is ground to a radius substantially smaller than the radius of the opening to be measured and thus makes line contact with the interior of the opening to be measured such as, for example the interior of the sleeve S, the contact line of member 21 being parallel to the axis of the body 20. Body 20 may be composed of steel. The forward end of the body is recessed as at 22 (see Figures 3 and 4) to receive the spring pressed locating pieces 23, 24 and 25. These locating pieces are substantially identical and are generally Y-shaped in section. The lower legs of the Y's, indicated at 26, 27 and 28, respectively, make sliding fits in the slot or recess 22 of the body 20, the movement of the locating pieces in the slot being along the diameter of the measuring head that passes through the line of contact of the anvil 21 with the sleeve S; this diameter is indicated by the center line in Figure 3.

The locating pieces 23, 24 and 25 are preferably constructed of the same material as the body 20 and are provided with work contacting surfaces or projections 29 and 30, 31 and 32, and 33 and 34, respectively; they are ground to small radii to provide convex cylindrical surfaces extending parallel to the axis of the body, and thus make line contact with the interior surface of the sleeve, the lines of contact being parallel to the axis of the body 20. The projections are rounded at their ends as shown in Figure 2 so that the head may be easily inserted within an opening to be measured.

The locating pieces 23, 24 and 25 are held in position against endwise displacement by means of an end plate 36 which is secured to the body 20 by screws 37. The locating pieces are urged radially outwardly to engage the internal surface to be measured by means of springs 38, the ends of which are seated in openings 39 and 40 in the bottoms of the locating pieces and the bottom of the slot 22, respectively. Outward movement of the locating pieces is limited by the pin 41 which is secured in the end plate 36, extends through slots 42 in the locating pieces and into the body 20. With this arrangement the spring pressed locating pieces hold the anvil 21 in line contact with the internal surface of the openings to be measured so that the axis of the gauge head is substantially parallel with the axis of the opening, and locate the center of the gauge head on a diameter of the opening passing through the line of contact of the anvil and the internal surface of the opening.

The diameter of the opening is measured by means of the gauging point 45 which is supported for movement along a line extending through the line of contact of the anvil with the internal surface and the center of the gauge head. This line, of course, coincides with a diameter of the opening when the gauge head is properly positioned in the opening to be measured. The work contacting end of the gauge point 45, which may be composed of sapphire or other very hard material, is preferably spherical in shape and of small radius so that it will make point contact with the interior surface of the opening.

In order to support the gauging point and to translate the position of the gauging point to indications of a meter or the like, the gauging point is mounted near the end of leg 46 of a bell crank lever 47. The bell crank 47 is pivotally mounted on the movable frame member 48 of the handle portion 10 of the gauge by means of the hinge spring 49. The leg 46 of the bell crank extends outwardly from the handle member 10 through the slot 50 in the body 20 of the gauge head and aligned slots 51 and 52 of the locating pieces 25 and 24 respectively, terminating in slot 53 of the locating piece 23, the gauging point 45 projecting radially from substantially the midportion of the slot 53. The other leg 54 of the bell crank is connected to the pickup indicated in general at 55; pickup 55 is carried by the movable frame member 48. Thus, the pickup is actuated by movement of the gauging point and bell crank with respect to the movable frame member 48, and these movements are used to operate the indicating meter or the like of the gauge as will be described below.

In order to support the gauge head 11 and locate it accurately with respect to the handle 10 so that the gauging point 45 will be located properly with respect to the locating pieces and anvil 21, the gauge head is secured as by means of screw 56 to the end face 57 (see Figure 7) of the fixed frame member 58 of the handle 10. The end surface of the body 20 is provided with a projection 59 (see Figure 2) the edges of which are parallel to a diameter of the gauge head passing through the line of contact of anvil 21 and point of contact of gauging point 45 with the work. Projection 59 fits accurately into a groove 60 in the end face 57 in order to position the gauge head properly with respect to the handle. Screw 56 is readily accessible through the passageway 61 provided by aligned openings in the end plate 36 and locating pieces 23, 24 and 25 so that the gauge head can be removed as a unit simply by removing screw 56 from the fixed frame member 58.

The movable frame member 48 of the handle is accurately located with respect to the fixed frame member 58 by means of the pin 63 on which one end of the frame member 48 is pivotally mounted; the ends of pin 63 are accurately fitted into openings in the fixed frame member 58. The other end of the movable frame member 48 is provided with a projecting portion 64, the opposite sides of which are engaged by set screws 65 and 66 in fixed frame member 58 and which may be adjusted by means of a tool inserted through openings 67 and 68, respectively, to secure the movable frame member 48 in a desired position of adjustment with respect to the fixed frame member 58. The adjusting movement of the movable frame member is about the pivot pin 63 which is located in the fixed frame member at right angles to the groove 60 and hence also at right angles to the projection 59 of the head and to the diameter to be measured. Inasmuch as the gauge head, and therefore the anvil, are rigidly mounted on the fixed frame member 58, while the gauging point and pickup are carried by the movable frame member 48, adjustment of the movable frame member about the pivot 63 adjusts the position of the gauging point with respect to the anvil without affecting the relationship between the gauging point and the pickup. Hence the adjustment of the movable frame member can be utilized to set the gauge to a zero position.

While any convenient type of pickup or indicating mechanism can be employed to indicate the direction and extent of the deviations of the gauging point 45 from a predetermined zero position, we prefer that the pickup mechanism 55 be constructed generally in accordance with the disclosure of the aforesaid applications of Erwin W. Graham and Michael Bozoian. Such a pickup may comprise a substantially E-shaped field structure 70 which is rigidly mounted in the channel-section central portion of movable frame member 48 (see Figures 2 and 8) and disposed in a recess 71 in the fixed frame member 58. The field structure 70 provides three pole pieces 72, 73 and 74 on which coils 75, 76 and 77 are wound. The field structure is preferably laminated and composed of transformer iron and the projecting ends of the pole pieces 72, 73 and 74 are preferably of rectangular cross section as shown.

Movement of the bell crank 47 caused by displacement of the gauging point 45 is transmitted through a spring connecting link 78 to the ferromagnetic armature 79 carried on a non-magnetic stem 79a which is supported for substantially longitudinal movement close to the ends of the pole pieces 72, 73 and 74 by spring links 80 and 81. The links preferably are constructed in the manner disclosed in the aforesaid Graham application and are secured rigidly to the base portion of the field structure 70 as by cap screws 82 and 83. With this arrangement, movement of the gauging point results in corresponding longitudinal movement of the armature with respect to the pole pieces 72, 73, and 74; the movement of the armature changes the flux paths between the end coils 75 and 77 which constitute pickup coils and the central or exciter coil 76. Inward movement of the gauging point moves the armature to the right as shown in Figure 2 of the drawings, increasing the flux linkage between the exciter coil 76 and the pickup coil 77 and reducing the linkage between the exciter coil 76 and the pickup coil 75. Outward movement of the gauging point moves the armature 79 to the left and has the opposite effect on the flux linkages of the coils. The armature is urged to the left and the gauging point is urged outwardly with the desired gauging pressure by the coil spring 84 which acts on the right-hand end of the armature.

As described in the aforesaid Bozoian application the exciter coil is preferably energized by low frequency alternating current, and alternating currents are therefore induced in the pickup coils 75 and 77. When the armature 79 is in zero or mid-position, equal voltages are induced in the two substantially identical pickup coils; these are connected in series opposition to each other and therefore the output of the pickup is zero. Movement of the armature 79 in either direction from its mid-position results in an increase in the voltage induced in one of the pickup coils and a reduction in the voltage induced in the other. The magnitude of the output of the pickup depends upon the distance that the armature is displaced from zero position while the phase of the output is governed by the direction of the displacement. By means of the circuits described and claimed in the said Bozoian application, the output of the pickup is amplified and applied to the zero center D. C. meter 14 in such manner that the position of the needle of the meter gives an indication of the direction and amount of displacement of the armature from its zero position and correspondingly of displacement of the gauging point 45 from its zero position; the circuits are such that the response of the meter to displacement of the armature is linear within the usable range. The circuits are stable and the sensitivity is such that displacements of the order of a few millionths of an inch are readily indicated on the meter.

In order to protect the pickup mechanism and to provide for convenient manipulation of the gauge, the fixed frame 58, movable frame 48 and pickup 55 are all enclosed within a protective metal sleeve 85 which fits closely around the fixed member 58 and is secured thereto by screws 86. The sleeve is apertured to provide access to the screws 65 and 66. The end of the fixed frame member 58 has a cylindrical recess which receives the cylindrical projection 87 of the insulating handle 88, the screws 86 extending through the flange 89 of the fixed frame member and into the projection 87. The insulating handle 88 is preferably composed of wood or other material having relatively poor heat conductivity, provides a convenient grip for the operator and substantially prevents the heat of the operator's hand from being transmitted to the gauging head sufficiently to affect the operation of the gauge.

The range of movement of the gauging point with respect to the anvil is necessarily small because of the high sensitivity of the instrument. In order to make the instrument adaptable to the measurement of articles of a wide range of sizes, we preferably provide gauging heads of different sizes for cooperation with a single handle or body portion 10. A gauging head of a larger size than the head 11 is indicated in general at 11a in Figures 9, 10 and 11. The construction of this head is substantially identical with the head 11 previously described except for its greater size. Thus the head 11a comprises a body 20a, an anvil 21a, locating pieces 23a, 24a and 25a having contacting projections 29a and 30a, 31a and 32a, and 33a and 34a respectively, and an end plate 36a. The locating pieces are urged radially by springs 38a to maintain proper contact of the projections and the anvil 21a with the internal surface of the opening to be measured.

The head 11a is secured to the body or handle 10 by screw 56, but in this instance because of the increased size of the head, the screw 56 is not disposed on the center of the head but is displaced therefrom so that when the head is assembled with the handle or body, the relationship between the gauging point 45 and the locating piece 23a will be substantially the same as the relationship between the point 45 and the locating piece 23 of the gauge shown in Figures 1-8 inclusive. Also, the work contacting projections 29a and 30a of the locating piece 23a and the work contacting projections of the locating pieces 24 and 25 are spaced farther from the gauging point 45, the arrangement being such that radii drawn from the projections 29a and 30a to the center of the head 11a include an angle substantially equal to the angle included by the similar radii drawn from the projections 29 and 30 to the center of the head 11. This relationship is preferably maintained in heads of varying sizes adapted for use with a single handle so that the centering action of the locating pieces will be substantially the same with all sizes of heads. The gauge head 11a is centered by the locating pieces with respect to the sleeve S' in the manner previously described.

The operation of the gauge is extremely simple. The power supply is turned on and the electronic devices in the circuit permitted to warm up for a few moments. Then the gauge is set to a zero position by, for example, inserting the gauge head into an opening of known dimensions and adjusting the position of the movable frame member 58 by means of the screws 65 and 66 until the needle of the meter 14 is approximately at the zero position. Then the final adjustment of the needle to zero is made by the zero setting knob 17 which varies an element in the circuit to adjust the position of the needle. Thereafter, it is only necessary to insert the gauge to a desired position in an opening to be measured, whereupon the position of the needle of the meter 14 indicates the deviation of the opening being measured from the opening of known dimension which was used to set the gauge to zero.

The spring pressed locating pieces hold the anvil and the gauging point in proper position with respect to the work without requiring any particular degree of care or skill on the part of the operator. Not only do the locating pieces and the anvil insure the positioning of the gauging point with great accuracy, but also errors due to the measurement being made along a line not precisely perpendicular to the axis of the opening being measured would tend to give readings that are too large, while errors due to the measurement being made along a line which does not pass through the center of the opening would tend to give readings that are too small; thus the errors tend to cancel each other. The result is that repeated measurements checking within a very few millionths of an inch can be obtained by inexperienced operators. The meter reading is practically instantaneous; thus the taper of openings can be determined rapidly by moving the gauge head in and out of the opening, while out-of-roundness can be determined by rotating the gauge head in the opening. Bell mouth effects close to the ends of the openings can be measured because the gauging point is positioned near the end of the gauge. Inasmuch as the anvil makes line contact with the work while the gauge point makes point contact, the presence of surface films and the like on the work does not seriously affect the accuracy of the measurements. The anvil is pressed against the work with uniform pressure by the springs which urge the locating pieces outwardly and the gauging point is urged into engagement with the work with uniform pressure by the spring 84. Thus the pressure exerted on the work by the measuring elements is predetermined and constant and outside of the control of the operator, eliminating this variable from the results.

The device is compact and stury and can be utilized under shop conditions to obtain highly accurate measurements. Because of the arrangement of interchangeable heads, a single gauging apparatus can be utilized with a number of heads for gauging articles of a wide range of sizes.

Those skilled in the art will appreciate that various changes and modifications can be made in the preferred form of the invention described herein. Therefore it is to be understood that the foregoing detailed description of the invention is given by way of example rather than limitation and that the scope of the invention is defined by the appended claims.

We claim:

1. An internal gauging device comprising a supporting member, a pickup disposed within said supporting member, an arm operatively connected to the pickup projecting axially of said supporting member beyond one end thereof and carrying a gauging point on the projecting portion thereof, said gauging point and arm being movable transversely of said supporting member, a gauge head detachably secured to said supporting member, said gauge head and said supporting member having interfitting parts accurately locating said gauge head on said supporting member, said gauge head carrying on one side thereof a fixed anvil member having a cylindrical surface adapted to make line contact with an internal surface to be measured and carrying on the opposite side thereof a plurality of unitary Y-shaped locating pieces, each of said locating pieces having a central recess opening on the side of said gauge head oposite said anvil and a work engaging projection on either side of said central recess, the work engaging projections and recesses of the locating pieces being aligned with each other, said arm carrying said gauging point being disposed in the opening provided by said aligned recesses and being spaced from the walls of said recesses, said locating pieces being independently movable and resiliently urged outwardly away from said anvil in a direction parallel to a line passing through the highest element of said cylindrical surface of said anvil and said gauging point, said gauging point being movable along said line.

2. An internal gauging device according to claim 1 wherein the gauge head is cylindrical, and the work engaging projections on the locating pieces have cylindrical surfaces adapted to make line contact with the surface to be measured along lines parallel to the line of contact of the anvil therewith.

3. An internal gauging device according to claim 1, wherein the interfitting parts on the gauge head and supporting member comprise a projection on one of said members and a groove on the other, said groove and projection extending parallel to said line passing through the highest element of said cylindrical surface of said anvil and said gauging point.

4. An internal gauging device according to claim 1 wherein the support for the arm and the pickup comprises a single movable frame member disposed within the supporting member, the position of the movable frame member with respect to the remainder of the supporting member being adjustable, whereby the position of the arm and gauging point with respect to the anvil can be adjusted without changing the relationship between the gauging point and the pickup.

5. An internal gauging device comprising a supporting member, a pickup disposed within the supporting member, an arm operatively connected to the pickup projecting axially of said supporting member beyond one end thereof and carrying a gauging point on the projecting portion thereof, said gauging point and arm being movable transversely of said supporting member, a gauge head mounted on said supporting member, said gauge head carrying one one side thereof a fixed anvil member having a convex surface adapted to engage an internal surface to be measured and carrying on the opposite side thereof a Y-shaped locating piece having a central recess opening on the side of said gauge head opposite said anvil and work engaging projections on either side of said central recess, said gauging point being disposed in said recess and said arm being spaced from the walls of said recess, said locating piece being resiliently urged outwardly away from said anvil in a direction parallel to a line passing through the highest point of said convex surface of said anvil and said gauging point, said gauging point being movable along said line.

6. An internal gauging device comprising a supporting member, a pickup disposed within said supporting member, an arm operatively connected to the pickup projecting axially of said supporting member beyond one end thereof and carrying a gauging point on the projecting portion thereof, said gauging point and arm being movable transversely of said supporting member, a gauge head secured to said supporting member, said gauge head carrying one one side thereof a fixed anvil member having a convex surface adapted to engage an internal surface to be measured and carrying on the opposite side thereof a plurality of locating pieces, said locating pieces being resiliently urged outwardly away from said anvil, each of said locating pieces having two circumferentially spaced work engaging projections, said work engaging projections and said anvil defining circles the centers of which substantially coincide with the center of an opening to be measured when said gauge head is inserted in such an opening, at least one of said locating pieces having a recess therein disposed between the work engaging projections thereof, said arm projecting into and said gauging point being disposed in said recess and spaced from the walls thereof, the line of movement of said gauging point coinciding with a diameter of such a circle, which diameter passes through a point of contact of said anvil with the surface of such opening.

7. An internal gauging device comprising an elongated supporting member, a pickup disposed within said supporting member, the pickup embodying an armature movable longitudinally of said supporting member, a bell crank pivotally mounted in the supporting member, one arm of said bell crank extending transversely of said supporting member and being connected to said armature by a flexible link, the other arm projecting axially of the supporting member beyond one end thereof and carrying a gauging point on the projecting portion thereof, a gauge head secured to said end of said supporting member, said gauge head and supporting member having interfitting parts, said gauge head carrying on one side thereof a fixed anvil member having a convex surface adapted to engage an internal surface to be measured and a plurality of slidably mounted, aligned Y-shaped locating pieces, said locating pieces being resiliently urged in a direction away from said anvil and along a line passing through the highest point of said convex surface of said anvil and the center of said gauge head, each of said locating pieces having a central recess opening on the side of said gauge head opposite said anvil and work engaging projections on either side of said central recess, said work engaging projections and recesses of said locating pieces being aligned and extending parallel to the axis of said gauge head, the arm of said bell crank carrying said gauging point being disposed in the opening provided by said aligned recesses and being spaced from the walls thereof and said gauge head being oriented with respect to said supporting member by said interfitting parts in such manner that said gauging point lies on and is movable along said line passing through a point of contact of said anvil with a surface to be measured and the center of said gauge head.

8. An internal gauging device comprising an elongated supporting member, a pickup disposed within said supporting member, the pickup embodying an armature movable longitudinally of said supporting member, a bell crank pivotally mounted in said supporting member, one arm of said bell crank extending transversely of said supporting member and being operatively connected to said armature, the other arm extending axially of said supporting member and carrying a gauging point, a gauge head secured to said supporting member, said gauge head carrying on one side thereof a fixed anvil member adapted to engage an internal surface to be measured and a locating piece, said locating piece being resiliently urged in a direction away from said anvil, said locating piece having a central recess opening on the side of said gauge head opposite said anvil and work engaging projections on either side of said central recess, said gauging point being disposed in said recess.

9. A gauging device comprising a supporting member comprising a main frame and a sub-frame adjustably mounted on the main frame for pivotal movement with respect thereto, a pickup disposed within said supporting member and mounted on said sub-frame, an arm supported by said sub-frame, said arm being operatively connected to the pickup and projecting axially of said supporting member beyond one end thereof and carrying a gauging point on the projecting portion thereof, said gauging point and arm being movable transversely of said supporting member, a gauge head secured to the main frame of said supporting member, said gauge head carrying a fixed anvil member adapted for cooperative use with said gauging point in making measurements, and means for adjusting the position of said sub-frame with respect to said main frame whereby the position of said gauging point with respect to said anvil may be adjusted without varying the relationship between said gauging point and said pickup.

10. A gauging device comprising a supporting member comprising a main frame and a sub-frame adjustably mounted therein, an anvil fixed with respect to said supporting member, a pickup disposed within said supporting member and mounted on said sub-frame, an arm supported by said sub-frame, said arm being operatively connected to the pickup and projecting axially of said supporting member beyond one end thereof and carrying a gauging point on the projecting portion thereof, said gauging point and arm being movable transversely of said supporting member, and means for adjusting the position of said sub-frame with respect to said main frame.

11. A gauging device comprising an elongated supporting member, a pickup disposed within said supporting member, the pickup embodying an armature movable longitudinally of said supporting member, a bell crank pivotally mounted in the supporting member, one arm of said bell crank extending transversely of said supporting member and being connected to said armature by a flexible link, the other arm projecting axially of the supporting member beyond one end thereof and carrying a gauging point on the projecting portion thereof.

12. A gauging device comprising a supporting member having a fixed main frame and a sub-frame pivotally mounted on the main frame, a pickup disposed within said member and mounted on said sub-frame, a bell crank pivotally mounted on said sub-frame, one arm of said bell crank being operatively connected to said pickup, the other arm projecting from said supporting member carrying a gauging point on the projecting portion thereof, an anvil fixed with respect to said main frame, and means for adjusting the position of said sub-frame on its pivotal mounting on said main frame and thereby adjusting said gauging point with respect to said anvil.

13. An internal gauging device comprising a gauge head adapted to be inserted into an opening to be measured and carrying on one side thereof a fixed anvil member adapted to engage the surface of the opening and carrying on the opposite side thereof a plurality of slidably mounted, aligned Y-shaped locating pieces, said locating pieces being resiliently urged outwardly away from said anvil, each of said locating pieces having a central recess opening on the side of said gauge head opposite said anvil and a work engaging projection on either side of said central recess, said work engaging projections and recesses of said locating pieces being aligned and parallel to the axis of said gauge head, said work engaging projections and said anvil defining circles, the centers of which substantially coincide with the center of an opening to be measured when said gauge head is inserted in such an opening, and a gauging point disposed in one of said recesses and an arm extending through another of said recesses and carrying said gauging point, said arm being spaced from the walls of said recesses, said gauging point being movable along a diameter of such a circle which diameter passes through a point of contact of said anvil with the surface of such opening.

ERWIN W. GRAHAM.
WALTER O. MINTEL.

References Cited in the file of this patent

UNITED STATES PATENTS

| Number | Name | Date |
|---|---|---|
| 1,583,208 | Walker et al. | May 4, 1926 |
| 1,619,834 | Stein | Mar. 8, 1927 |
| 1,810,710 | Johansson | June 16, 1931 |
| 1,816,061 | Storm | July 28, 1931 |
| 1,888,416 | Williams | Nov. 22, 1932 |
| 1,928,457 | Mershon et al. | Sept. 26, 1933 |
| 2,122,664 | Terry | July 5, 1938 |
| 2,159,343 | Poock et al. | May 23, 1939 |
| 2,216,796 | Aller | Oct. 8, 1940 |
| 2,235,533 | Roberts | Mar. 18, 1941 |
| 2,241,287 | Westcott | May 6, 1941 |
| 2,268,956 | Mestas | Jan. 6, 1942 |
| 2,397,196 | Neff | Mar. 26, 1946 |
| 2,439,595 | Cooke | Apr. 13, 1948 |
| 2,574,342 | Mennesson | Nov. 6, 1951 |